United States Patent [19]

Tittes et al.

[11] 4,396,181
[45] Aug. 2, 1983

[54] CONVERTER FOR REFINING LIQUID METAL

[75] Inventors: Allan F. Tittes; Kenneth H. Larson, both of Claypool; Elmer E. Burton, Phoenix; Kennith L. Britton, Claypool, all of Ariz.

[73] Assignee: Inspiration Consolidated Copper Company, Claypool, Ariz.

[21] Appl. No.: 208,400

[22] Filed: Nov. 19, 1980

[51] Int. Cl.$^3$ .......................................... C21B 13/08
[52] U.S. Cl. .................................. 266/248; 75/76
[58] Field of Search ...................... 266/248; 75/11, 76

[56] References Cited

U.S. PATENT DOCUMENTS

| | | | |
|---|---|---|---|
| 519,219 | 5/1894 | Allen | 266/244 |
| 1,153,921 | 9/1915 | Howand | 266/244 |
| 1,411,157 | 3/1922 | Bradley | 266/244 |
| 1,417,538 | 5/1922 | McGregor | 266/244 |
| 1,417,588 | 5/1922 | Van Amburgh | 266/244 |
| 1,980,373 | 11/1934 | Bowman | 266/248 |
| 2,606,016 | 8/1952 | Lindh | 266/244 |
| 3,224,871 | 12/1966 | Collin | 75/11 |
| 3,467,369 | 9/1969 | Shindo | 266/244 |
| 3,606,986 | 9/1971 | Greenberg | 266/248 |
| 3,727,587 | 4/1973 | Nebgen | 266/244 |
| 3,758,089 | 9/1973 | Kocks | 266/244 |
| 4,106,758 | 8/1978 | Leroy | 266/244 |

OTHER PUBLICATIONS

Biswas & Davenport, *Extractive Metallurgy of Copper*, pp. 177–203 (Pergamon Int'l Library 1980).

*Primary Examiner*—P. D. Rosenberg
*Attorney, Agent, or Firm*—Pennie & Edmonds

[57] ABSTRACT

A converter for refining liquid metals having a cylindrical horizontally disposed vessel (1) with a first opening (6) for charging and pouring and a second opening (13) circumferentially and longitudinally displaced from the first opening for exhaust gases to escape, is disclosed. The circumferential displacement is sufficient to prevent liquid metal from pouring from the second opening (13) when the vessel is rotated from a first position for charging materials into the vessel (1) through the first opening (6) to a second position for pouring the contents of the vessel (1) from opening (6). Cool air is provided to a region between the vessel (1) and a jacket (15) surrounding the vessel (1). A hood (14) collects the exhaust gases from the second opening (13) in any position to which the vessel (1) is rotated when it is used. End and circumferential seals structures are provided where hood (14) longitudinally and circumferentially contacts jacket (15).

11 Claims, 9 Drawing Figures

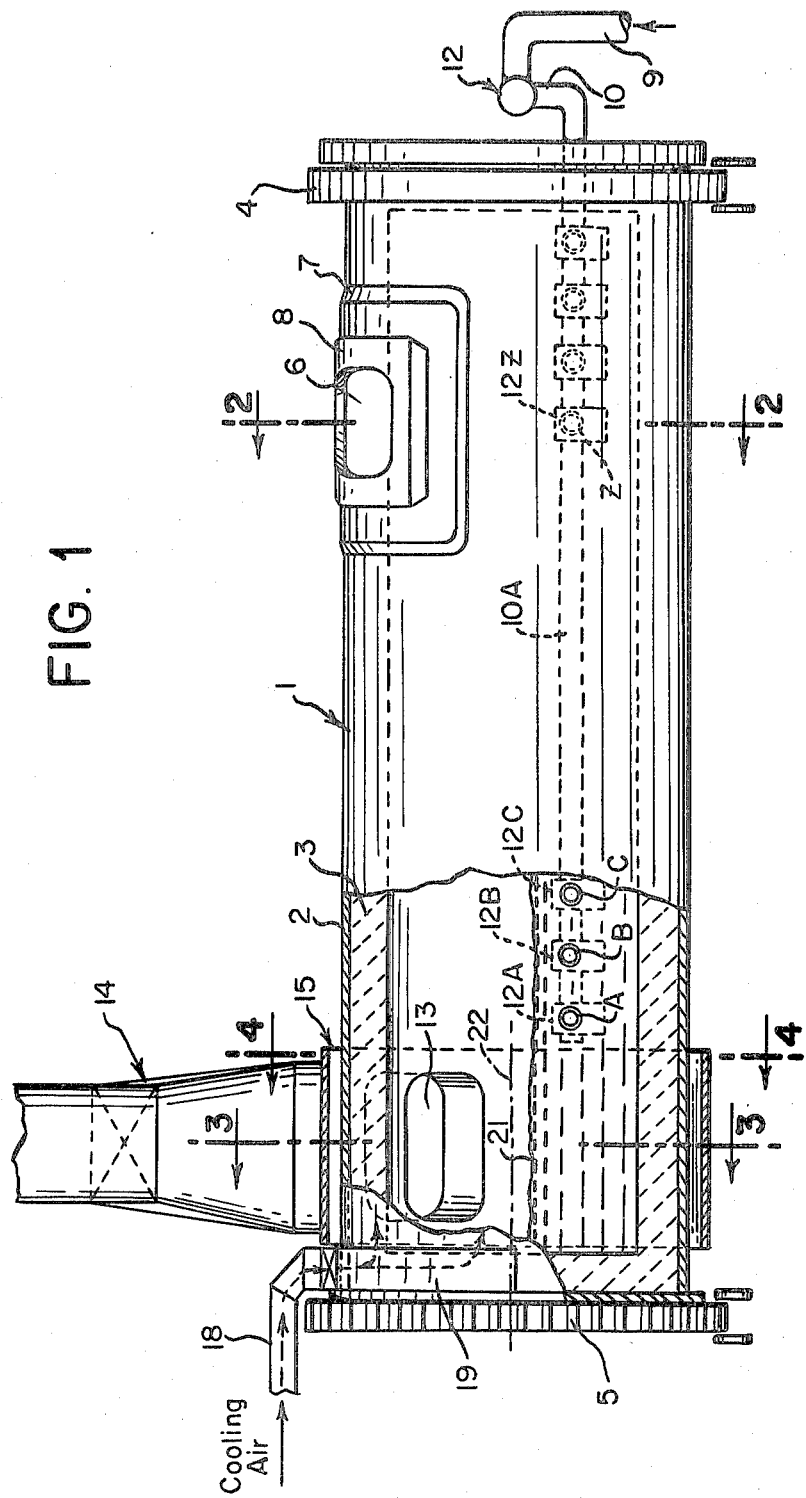

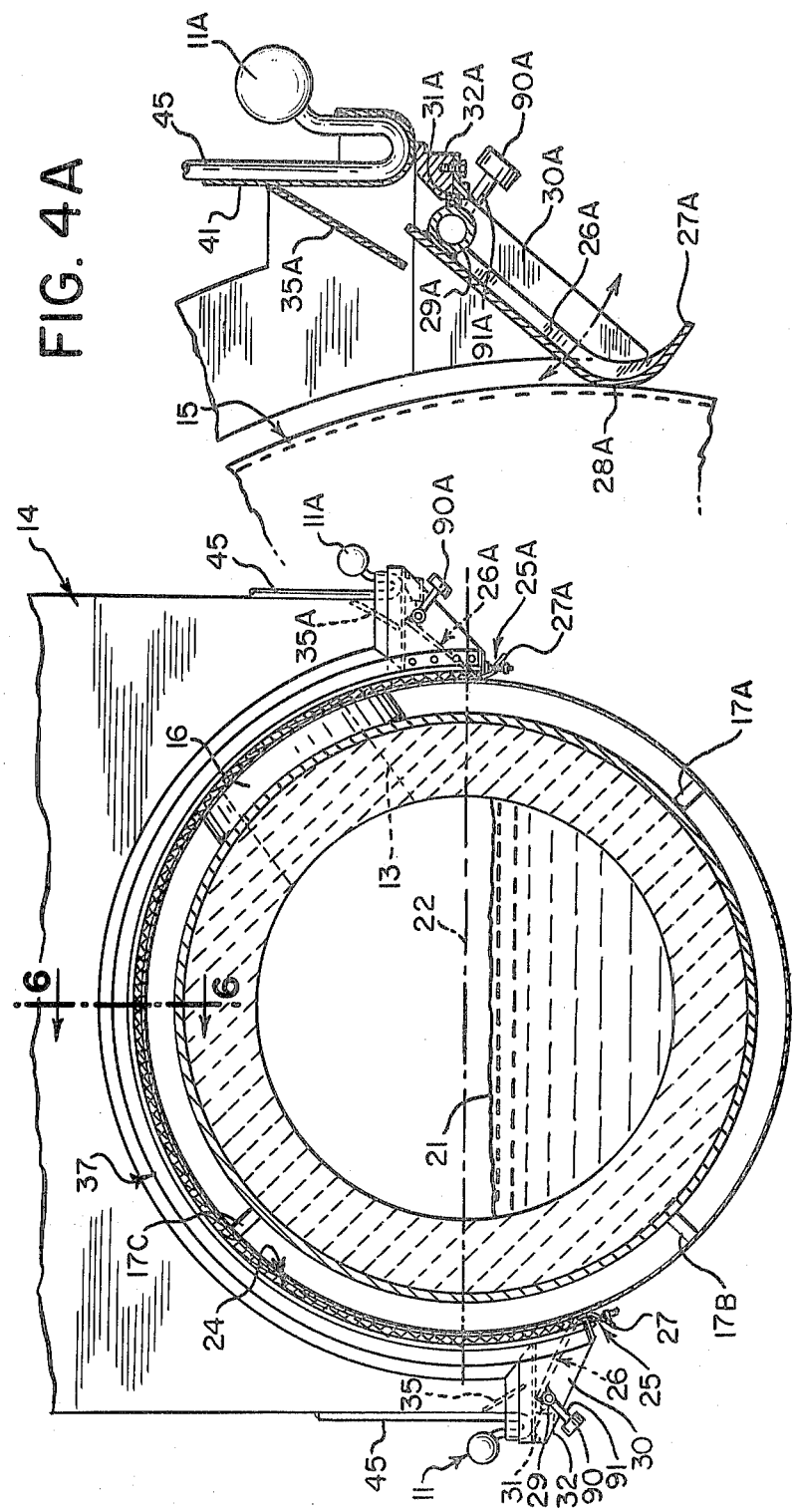

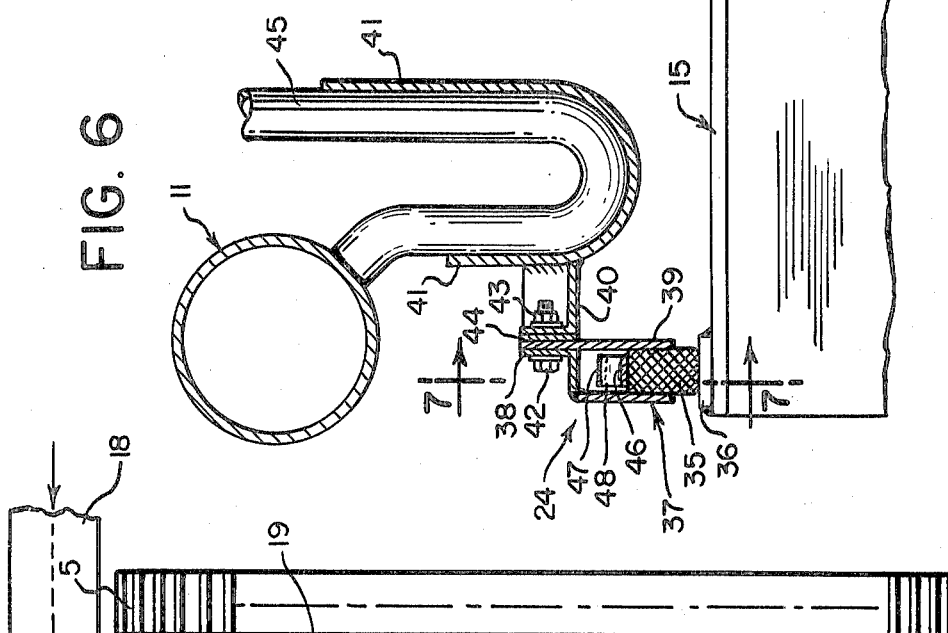
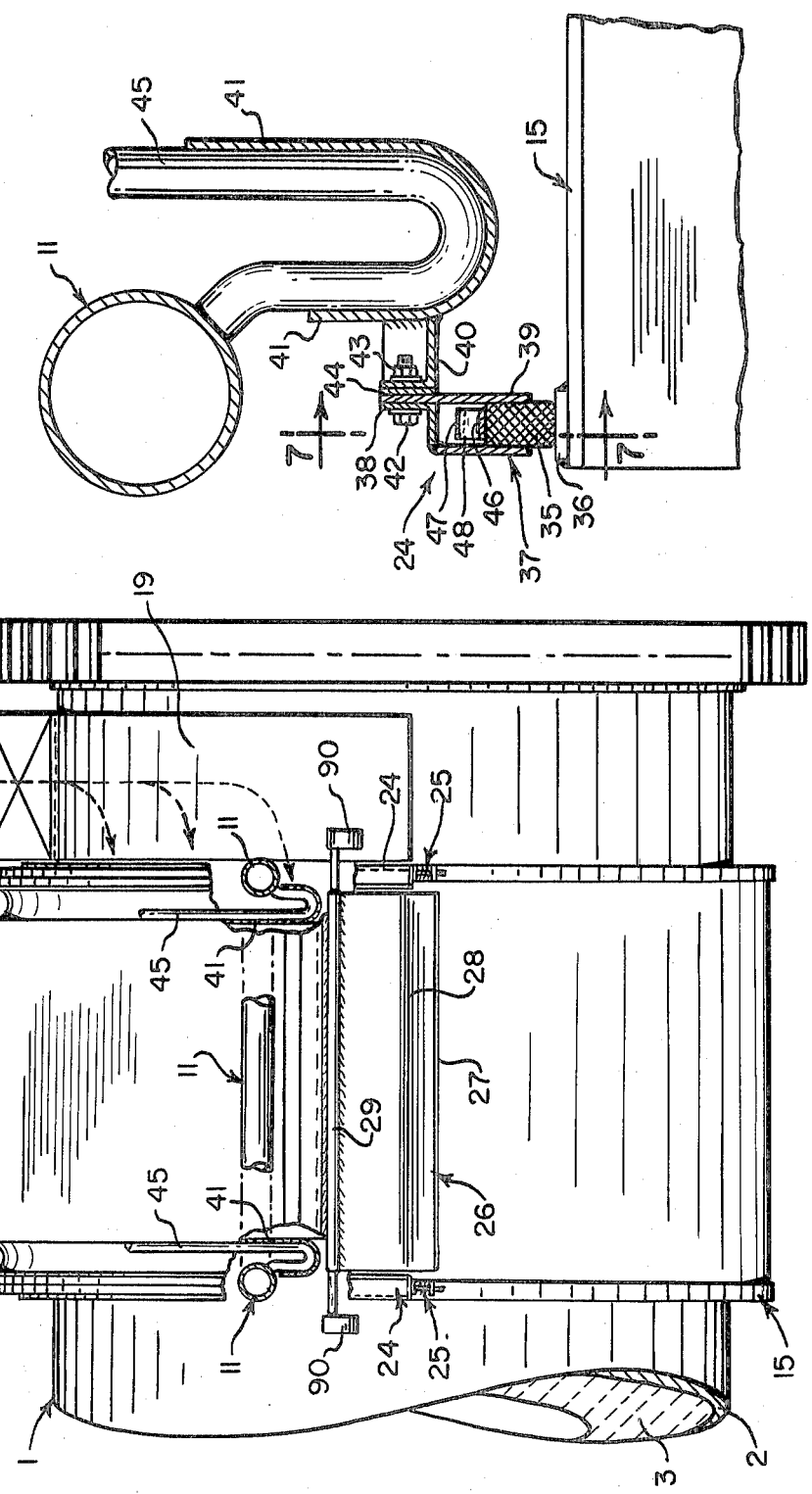
FIG. 5
FIG. 6

CONVERTER FOR REFINING LIQUID METAL

TECHNICAL FIELD

The present invention relates to an improved converter for refining metals in the liquid state. More particularly it relates to converters having cylindrical horizontal rotating reaction vessels, and to those converters used for refining copper matte.

BACKGROUND ART

It is the usual practice, when refining many molten metals to add materials, including an air or oxygen blast, to cause reactions which form reaction products with elements which are not desired in the refined metal. Such reaction products will often physically separate from the desired refined molten metal, allowing those products, and the metal, to be poured separately from a vessel in which the refining reactions have occurred.

For example, A. K. Biswas and W. G. Davenport, in *Extractive Metallurgy of Copper*, 2nd ed. (1980), available from Pergamon International Library, discuss in detail the converting of copper matte to crude or blister copper which is from 98.5 to 99.5 percent copper. Molten matte may contain a concentration of copper as low as thirty to thirty-five percent. It may also contain iron, sulphur, up to three percent dissolved oxygen, and an assortment of minor amounts of impurity metals, found in the original ore concentrate, but not removed during the smelting process.

This molten matte, charged at approximately 1100° C. into a converter, is oxidized by an air blast, to remove the above-mentioned impurities. The reactions accompanying the refinement are exothermic, raising the temperature of the molten material. In a first slag-forming stage FeS is oxidized to FeO, $Fe_3O_4$ and $SO_2$ gas. Silica flux is added to combine with the FeO and a portion of the $Fe_3O_4$ to form a liquid slag which floats on top of the molten matte and is poured off at several times during this first stage. Additional matte is added to the converter at intervals, followed by oxidation of a great portion of the FeS in that charge, and pouring off of the slag. When a sufficient amount of copper, in the form of matte is present in the converter, and the matte contains less than one percent FeS, a final slag layer is poured off, and the remaining impure copper is oxidized to blister copper.

Two types of converters have been used in the prior art. They are the Pierce-Smith converter and the Hoboken converter. Both have reactions vessels, or bodies, which are horizontally disposed cylinders.

The Peirce-Smith converter is discussed at page 179 of the reference cited above and includes one opening. The opening is used in connection with filling the converter, exhausting large volumes of $SO_2$ bearing gas which are generated during the blowing operation and collected by means of a loose-fitting hood above the body, and pouring molten metal from the converter. For pouring purposes, the vessel is mounted on running wheels so that it may be turned about its longitudinal axis until the opening is disposed below the level of the molten metal to permit it to flow out. The Hoboken converter is shown at page 198 of the above-cited reference and includes a mouth for filling and emptying and a separate opening at the right hand end for escaping fumes. This opening is disposed axially of the converter and between it and the molten metal is a dam structure designated in the drawing on page 198 as a goose neck.

With the Peirce-Smith converter, it is difficult to create a good seal at the single opening because of the pouring of the metal from the opening when emptying the converter. This metal creates a deposit and otherwise deteriorates the opening so that it is difficult to assure that the hood for escaping exhaust will properly seal against the opening. A good seal is desirable to prevent noxious gases from escaping, and to prevent the dilution of the $SO_2$ component by air, which is undesirable when the $SO_2$ is used to produce sulfuric acid in an auxiliary process.

The problem of the Peirce-Smith converter is somewhat eliminated by the Hoboken converter. The goose neck is spaced to permit only gases to flow over the dam out the exhaust opening. This is rather a complicated, expensive structure, however, and during turning of the converter, liquid metal may reach the exhaust opening and cause deterioration of it and its associated structures. In addition, the presence of the dam decreases the capacity of the reaction vessel.

DISCLOSURE OF THE INVENTION

The present invention is a converter for the refinement of liquid metal of the type with a generally cylindrical horizontal hollow reaction vessel which rotates on its horizontal axis. A first opening in the vessel is used to charge molten material which is to be refined into the vessel. A second opening is used to exhaust hot gases produced in the refinement process, usually as a result of an air blast which is provided to the molten material. The second opening is longitudinally and circumferentially displaced from the first opening, with the circumferential displacement being sufficient to prevent liquid metal from pouring from the second opening when the vessel is rotated from a first position for charging material into the first opening to a second position for pouring the contents of the vessel from the first opening. A hood which is in circumferential and longitudinal contact with the converter body covers an area of the body sufficient to allow capture of the hot exhaust gases as the converter is rotated from the first position to the second position.

A means for cooling the outside of the converter body in the area of the second opening is provided. An air cooled jacket or shield circumferentially surrounds the converter body in this region. Cool air is blown into an open circumferential end of this jacket, and permitted to exit at the opposite open end. A duct which is circumferentially spaced from the body and has an opening directed toward the open end of the jacket provides a source of cool air. When this jacket is used, a radial extension of the second opening extends to the jacket, in which a hole is provided to allow exhaust gases to escape. The hood must ride on the jacket, rather than on the body of the converter vessel.

The hood is provided with a means of making reasonably good contact with the jacket. A seal is provided where the hood circumferentially or longitudinally contacts the jacket. The longitudinal seal is provided by means of a metal plate with a convexly curved edge which rides on the jacket. This plate, which is attached to a bar which can rotate, is biased against the jacket. When material is deposited on the jacket, and the region of deposit rotates beneath the lines where the plate contacts the jacket, the plate will be momentarily displaced from the jacket until the region of deposited material has rotated away from the plate. The circumferential seal is comprised of a circular braided refractory material with a rectangular cross section, which is disposed in a housing which follows the circumference of the jacket. The housing has an opening through which the material depends radially toward the jacket. A retaining band, within the housing is attached to the side of the material opposite the jacket. A plurality of compression spring means are located between the retaining band and a tensioning band located radially outward from the retaining band, all within the housing. Means are provided for putting the tensioning band into tension, thereby, through the compression spring means, biasing the material into contact with the jacket.

Cooling of the hood is provided by a network of tubes through which water is circulated on the outside walls of the hood. The hood is operated at a slight negative pressure with respect to atmosphere, thus preventing noxious gases from being vented from the first opening. This pressure is adjusted to be low enough to prevent atmospheric gases from being drawn into the converter through the first opening, preventing the dilution of the exhaust gases.

BRIEF DESCRIPTION OF THE DRAWINGS

Additional features and advantages of the invention may be readily ascertained by reference to the following description and appended drawings in which:

FIG. 1 is a side elevation of the apparatus of the invention in partial cross section, showing the converter vessel and hood.

FIG. 4 is an enlarged side elevation of the apparatus as viewed along line 4—4 of FIG. 1.

FIG. 4A is an enlarged cross sectional view of the end seal structure of FIG. 4.

FIG. 5 is a more detailed and enlarged side elevation, viewed from a direction opposite the viewing direction of FIG. 1 showing details of the hood.

FIG. 6 is an enlarged cross sectional view taken along line 6—6 of FIG. 4 showing details of the hood and circumferential seal structure.

BEST MODE FOR CARRYING OUT THE INVENTION

Figure 3:
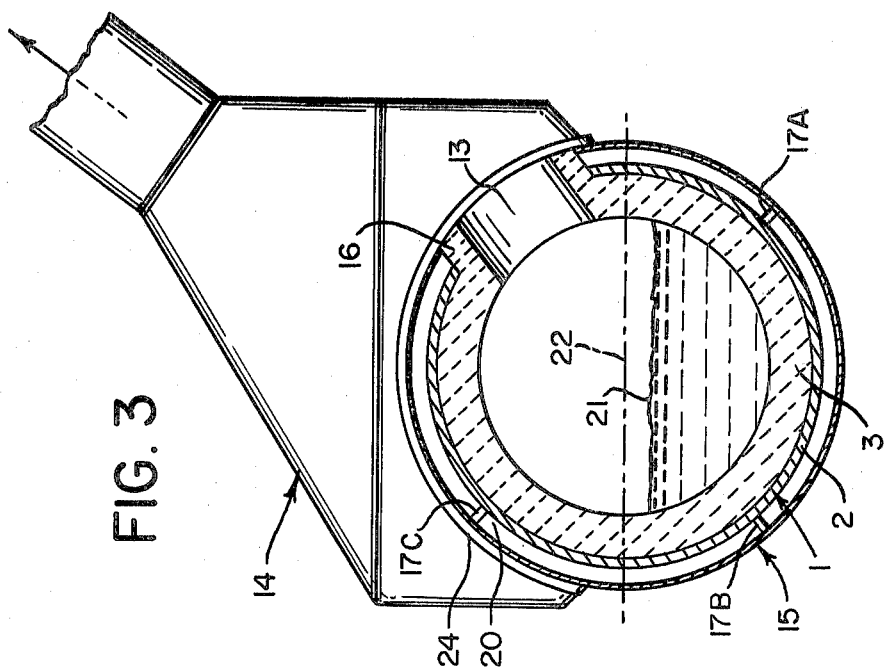
FIG. 3 is a cross section taken along line 3—3 of FIG. 1.

Referring to FIG. 1, a side elevation of the apparatus of the invention is shown. This comprises a generally cylindrical hollow reaction vessel 1 formed of a steel shell 2 and lined with refractory brick 3, of a type well known in the art. The reaction vessel is approximately forty six feet long in this preferred embodiment and approximately fourteen feet in outer diameter, but it is recognized that other dimensions may be used, depending on the quantity of material which must be refined.

Vessel 1 is supported at one end in riding ring 4, which is essentially a bearing. This bearing must be capable of supporting the weight of vessel 1, while withstanding high operating temperatures at the outside of steel shell 2. It must also allow the end of vessel 1 to move longitudinally for a short distance due to thermal expansion and contraction of vessel 1 as its temperature goes from ambient levels to that of the molten metal with which it is charged, and back to ambient levels. This is typically a change in length of approximately one and one half inches.

The opposite end of vessel 1 is similarly supported, but expansion is not taken up at this end. In addition, a means for rotating vessel 1 is associated with this end. Typically, a gear driven ring 5 is used. A gear, not shown and usually of small diameter, rotated by an appropriate motor, meshes with gear teeth associated with ring 5. Such drive mechanisms are well known in the art.

Liquid metal, or materials needed for refinement are charged into vessel 1 through opening 6. Molten copper matte for example is charged by means of appropriate ladles. A properly positioned chute may be used to charge solid materials such as fluxes. Opening 6 may have an area of approximately twenty seven square feet. The outside area of shell 2 surrounding opening 6 is reinforced by a metal plate 7. An additional metal structure forms a pouring spout 8, which facilitates pouring of molten material, such as slag or refined metal from vessel 1. The nature of spout 8 is more readily seen with reference to FIG. 2.

A source of a blast gas, typically air, but possibly oxygen, which facilitates refinement by oxidation of impurities, is provided. The gas is conducted to the vessel by duct 9, which connects to radial extension 10 of manifold 10A, by means of ball joint 12, located on the rotational axis of vessel 1 and therefore permitting rotation of extension 10 with vessel 1. A series of blast pipes or tuyeres A, B, etc. are provided from manifold 10A which comprise a path for air to be injected into vessel 1, below the surface of molten material contained therein. In the preferred embodiment approximately fifty-five tuyeres of two inch inner diameter are used. The amount of blast gas required can readily be calculated by one skilled in the art. It is understood that a smaller or greater number of tuyeres may be used as required. A series of mechanisms 12A, 12B, etc. are provided, one for each tuyere, with a metal ram which can fit into the tuyeres. The mechanism causes these rams to punch solid material which has accumulated in the tuyeres, blocking the flow of the blast back into the vessel.

Figure 2:
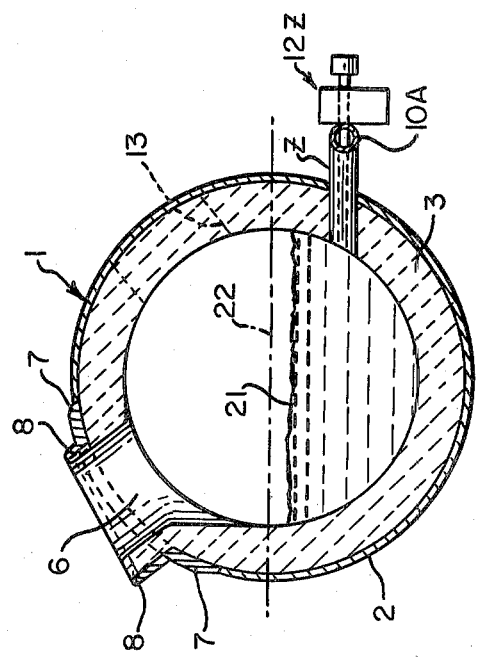
FIG. 2 is a cross section taken along line 2—2 of FIG. 1.

A vent opening 13 through which gas produced by the refining process can escape with an area of thirty six square feet in this embodiment is provided. This opening is disposed at a point longitudinally displaced, and circumferentially displaced with respect to opening 6, as can be seen by reference to FIG. 2 and FIG. 3. This circumferential displacement of the center line of openings 6 and 13 is chosen so that opening 13 falls under a hood 14 which is in circumferential and longitudinal contact with vessel 1, over an area sufficient to cover opening 13, for the purpose of collecting hot, noxious, but often industrially useful gases which are vented through opening 13, in any operating position to which vessel 1 may be rotated. The circumferential displacement is also sufficient to prevent liquid metal from pouring from opening 13 when vessel 1 is rotated from a first position for charging materials into opening 6 to a second position for pouring the counters of the vessel from opening 6. The position shown in FIG. 2 and FIG. 3 is the charging position. The vessel can be rotated in a counter clockwise direction for approximately 90° to pour material from charge spout 8, which is configured as a half cone to aid the pouring process. In this latter position, opening 13 will remain beneath hood 14.

While hood 14 may, in some embodiments rest on vessel 1, a preferred configuration comprises an air cooled jacket 15, attached to and surrounding vessel 1, in order to reduce the temperature that seals on hood 14 must be exposed to and to prevent deterioration of the metal shell in the area of opening 13 as a result of prolonged exposure to high temperatures. As shown in FIG. 3 a radial extension 16 of opening 13 extends to jacket 15. An opening, coextensive with the intersection of the inner diameter of extension 16, as it contacts jacket 15 is supplied in jacket 15, so that exhaust gases may escape into hood 14 which is in circumferential contact with jacket 15 by means of circumferential or periphery seal 24 and in longitudinal contact with jacket 15 by means of end seals, shown in FIG. 4 and described below.

Duct 18 of FIG. 1, conducts cool air to duct 19 which is circumferentially spaced slightly from vessel 1 to permit rotation of vessel 1. Duct 19 which is generally of rectangular cross section extending approximately 180 degrees around vessel 1, but possibly extending completely around it, has an opening only in its radially disposed wall adjacent to jacket 15. Jacket 15 has open circumferential ends, as best visualized in FIG. 3. Thus air from duct 19 moves through this opening, not shown, in its radially disposed wall into the region 20 between vessel 1 and jacket 15. This air simply flows through region 20 exiting from the end of jacket 15 opposite the end adjacent duct 19. Struts 17, 17A and 17C serve to position jacket 15 circumferentially with respect to vessel 1. A larger quantity of struts may be used if necessary.

Referring to FIG. 2, the charging, or bath level 21, in the converter is shown with respect to the converter center line 22. While FIG. 2 shows line 21 as being below center line 22, the converter can be charged as high as center line 22 if opening 6 is properly located. During the blowing operation, slag formed will float on molten matte, and may rise to a level approximately six inches above line 22. While the converter may be operated at somewhat lower levels, maximum efficiency is generally achieved with a maximum charge. Spout 8, useful in pouring, is preferably of the shape of an angularly cut cylinder. A typical tuyere Z, connected to manifold 10A, and punched out as necessary by a steel rod associated with mechanism 12Z is shown. Such mechanisms are well known in the art.

In FIG. 4, FIG. 4A and FIG. 5, hood 14 is illustrated in greater detail. Circumferential seal 24, one of two which seal hood 14 to jacket 15 is more fully described below with reference to FIG. 6, and tensioning means 25 and 25A which bias the seals against jacket 15 are more fully described with reference to FIG. 7 and FIG. 8.

Referring to FIG. 4, FIG. 4A and FIG. 5, end seal plates 26 and 26A are metal plates with curved ends 27 and 27A respectively. The distal end of plates 26 and 26A are connected to rods 29 and 29A which are hollow, but could also be solid. These rods rotate within bushings in the wall of seal covers 30 and 30A associated with hood 14. A means such as a spring or preferably counterweights 90 and 90A on extentions 91 and 91A of rods 29 and 29A are provided for rotationally biasing curved convex areas 28 and 28A of plates 26 and 26A in contact with jacket 15. Secondary seals 31 and 31A provide sealing between rods 29 and 29A and seal supports 32 and 32A of the structure of seal covers 30 and 30A.

When vessel 1 rotates, end seal plates 26 and 26A ride on the surface of jacket 15. If any material is deposited on jacket 15 which functions as an elevation of its surface, seal plates 26 and 26A will be formed to rotate away from longitudinal contact with jacket 15 until the material has passed areas 28 or 28A. This will decrease the effectiveness of the seal, allowing some atmospheric gases to enter the hood, but will usually only be of a momentary nature.

The walls of hood 14 are cooled by water circulated through a network of tubes, as represented by tubes 45 located on the outside surface of the hood. Cooling water may be provided from any suitable source, but it is recognized that its temperature may be elevated to the point where high pressures are needed to keep it in the liquid state. For example, water at a temperature of approximately 250° C. and a pressure of 1000 lbs. per square inch may be used. The cooling tubes must then be fabricated from suitable materials and by appropriate techniques well known in the art. Appropriate means of connection to the coolant source, such as feed pipe 11 is used.

Particulate material is deflected by deflecting shields 35 or 35A to prevent accumulation of material behind seal plates 26 and 26A and their associated structures.

During the refinement process hood 14 is operated with a slight negative pressure, typically equal to two and one half inches of water, with respect to atmosphere. This slight suction, provided by means of a variable speed draft fan, well known in the art, prevents the escape of hot noxious gas from opening 6 if it is left uncovered, as is generally required to allow observation of the progress of the refinement, and pouring off of slag produced by repeated charging and refining steps. It is generally undesirable to draw air into opening 6. This is prevented by keeping the suction pressure low, as indicated. This serves to prevent the dilution of the hot exhaust gases which in copper refining contain high percentages of sulfur dioxide, and can be used to manufacture sulfuric acid in an auxiliary plant. This plant may provide the slight suction necessary to reduce the hood pressure.

Hood 14 is preferably supported by a suitable structure a short distance above vessel 1. This assures that thermal expansion and contraction of the hood structure will not adversely affect the efficiency of the circumferential seals. The hot exhaust gases are cooled, preferrably by a heat exchanger. Waste heat may be recovered for use elsewhere, and the gases cooled to a temperature appropriate for further chemical processing.

Figure 7:
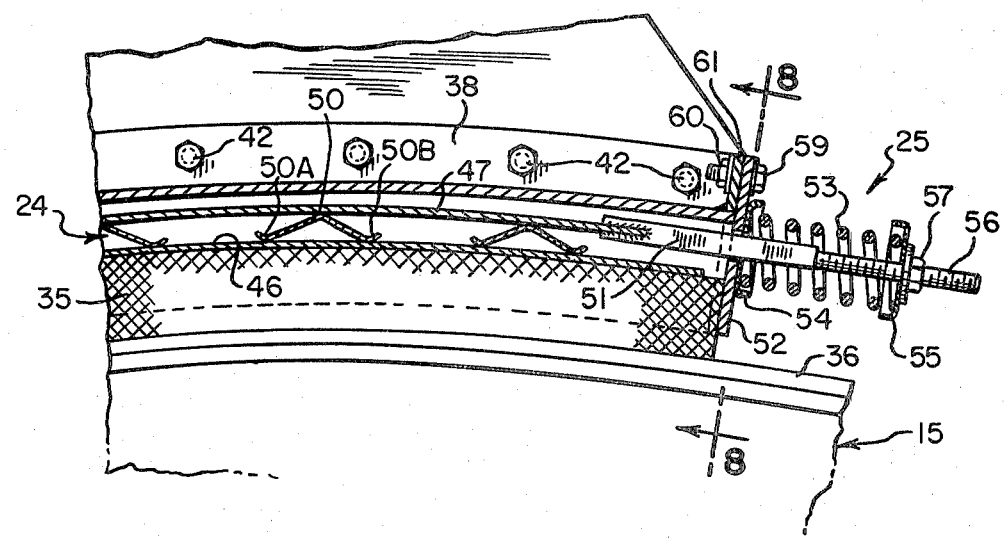
FIG. 7 is a cross sectional view taken along line 7—7 of FIG. 6.

Referring to FIG. 6, a cross section of an area of the hood, showing the structure of one of the two circumferential seals 24 is shown. Seal material 35, a flexible braided packing material of rectangular cross section containing refractory asbestos and graphite components, is forced into contact with a smooth raised surface of a generally rectangular elevation 36 disposed circumferentially around jacket 15. Seal material 35 is disposed in housing 37 which is formed from parts 38 and 39 and is curved to follow the circumference of jacket 15, and fastened at regular intervals to a flange 40, connected to a curved extension of wall 41 of hood 14. Bolt 42 and nut 43, typical of many that are used (as can be seen in FIG. 7), serve to fasten parts 38 and 39 to flange 40. A gasket 44 of suitable refractory material, which may be similar to that of seal material 35 is provided between part 39 and flange 40. As previously described, tube 45 through which water is circulated serves to cool wall 41 and its circular extension.

Located within housing 37 is retaining band 46 to which the side of seal material 35 opposite elevation 36 is attached. A tensioning band is also within housing 37, spaced radially outward from retaining band 46 by a plurality of spring clips one of which is shown as spring clip 48. Band 47 is used, when it is pulled into tension by tensioning means 25 (shown in FIG. 4 and described in more detail with reference to FIG. 7 below) to bias seal material 35 against elevation 36.

Referring to FIG. 7, a cross section taken along line 7—7 of FIG. 6, the V-shaped spring clips, only one of which is shown in FIG. 6, are illustrated. While many compression spring means could be used between bands 46 and 47, these spring clips are particularly convenient. The apex 50 of each clip is welded to the tensioning band, leaving the curved ends of the V 50A and 50B free to move slightly with respect to band 46 as band 47 is tightened by tensioning means 25, also illustrated in detail in FIG. 7.

Figure 8:
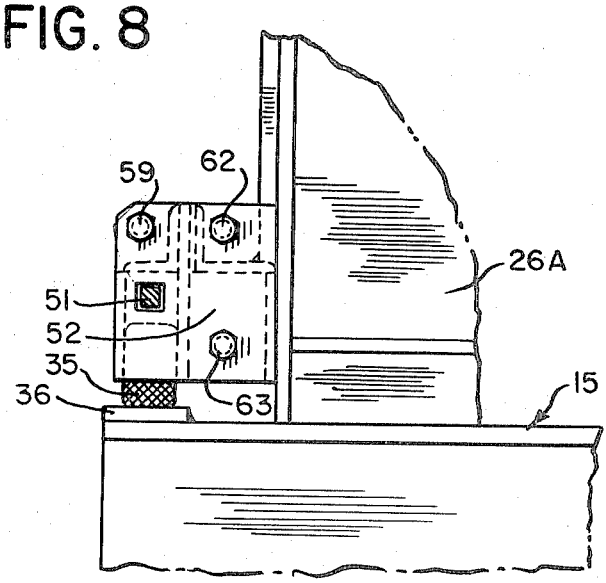
FIG. 8 is a cross sectional view taken along line 8—8 of FIG. 7.

Each end of band 47 is securely fastened in a slot of an elongated member 51. This member is of a noncircular cross section preferably square in the region along its length where it passes through a similarly shaped closely fitting hole in end plate 52, as is best illustrated in FIG. 8. Spring 53 is disposed over member 51 between retainers 54 and 55. A portion of member 51 which comprises the end 56 of member 51 that does not connect to band 47 is of circular cross section, and threaded. A nut, 57 moves on this thread, bearing against retainer 55 when it is rotated in the direction which causes it to approach end plate 52, thus supplying a tension to band 47 by virtue of the compression of spring 53, which may be one half inch from an uncompressed state due to a load of typically 500 lbs. As is shown in FIG. 4, there are two tightening means, one located at each end of circumferential seal structure 24. In practice the nut 57 associated with each tensioning means may be tightened to provide equal compression of the springs.

Bolt 59 and nut 60 of FIG. 7 are one of three pairs of fasteners, the bolts shown as 59, 62 and 63 in FIG. 8 which serve the function of fastening end plate 52 to a flange 61 connected to housing parts 38 and 39. Also shown in FIG. 8 is end seal plate 26A in contact with jacket 15.

It should be noted that seal material 35 is generally flexible, and will deform should any deposits occur on elevation 36 of jacket 15, as jacket 15 rotates with respect to the seal structure of hood 14. Thus, in contrast to the case of the end seal plates, a reasonably good seal can be maintained despite minor build up of deposits between material 35 and elevation 36. Even small deposits are unlikely however, as material 35 serves to cover the operative area of elevation 36 when it could be exposed to hot exhaust gases, which may contain particles of material that deposit on exposed surfaces.

Various modifications of the invention in addition to those shown and described herein will become apparent to those skilled in the art from the foregoing description and accompanying drawings.

What is claimed is:

1. A converter for the refinement of liquid metals comprising:
    (a) a generally cylindrical horizontal hollow vessel mounted to rotate on its horizontal axis, said vessel having an outer cylindrical, longitudinally extending surface;
    (b) a first opening in said vessel on the outer cylindrical surface thereof at one location about the circumference of the cylindrical surface;
    (c) a second opening in said vessel through which gas produced during said refinement can escape, said second opening also being on the outer cylindrical surface thereof and being longitudinally and circumferentially displaced from said first opening, with the circumferential displacement being sufficient to prevent liquid metal from pouring from said second opening when said vessel is rotated from a first position for charging materials into said first opening to a second position for pouring the contents of said vessel from said first opening; and
    (d) a hood in circumferential and longitudinal contact with said vessel to cover said area of said vessel sufficient to cover said second opening as said vessel is rotated from said first position to said second position.

2. The converter of claim 1 further comprising means of supplying a gas to the material in said vessel to facilitate said refinement.

3. The converter of claim 1 or claim 2 further comprising means of cooling the hood, whereby the hood is protected from hot gases associated with said refinement.

4. The converter of claim 3 wherein the means for cooling the hood comprises a network of tubes through which water is circulated, said tubes located on outside walls of said hood.

5. The converter of claim 1 or claim 2 further comprising a means of cooling an area of outside surface of said vessel surrounding said second opening.

6. A converter for the refinement of liquid metals comprising:
    (a) a generally cylindrical horizontal hollow vessel mounted to rotate on its horizontal axis, said vessel having an outer cylindrical, longitudinally extending surface;
    (b) a first opening in said body on the outer cylindrical surface thereof at one location about the circumference of the cylindrical surface;
    (c) a second opening in said vessel through which gas produced during said refinement can escape, said second opening also being on the outer cylindrical surface thereof and being longitudinally and circumferentially displaced from said first opening, with the circumferential displacement being sufficient to prevent liquid metal from pouring from said second opening when said vessel is rotated from a first position for charging materials into said first opening to a second position for pouring the contents of said vessel from said first opening;
    (d) a jacket fixed to said vessel, said jacket extending circumferentially around said vessel and longitudinally along said vessel in an area of said vessel including said second opening;
    (e) an extension of said second opening extending radially from said vessel to said jacket;
    (f) an opening in said jacket allowing said gases to pass through said jacket;
    (g) open ends of said jacket circumferentially surrounding said vessel;

(h) means for supplying a cool gas to the region between said vessel and said jacket; and (i) a hood in circumferential and longitudinal contact with said jacket over an area of said jacket sufficient to cover said opening in said jacket as said vessel is rotated from said first position to said second position.

7. The converter of claim 6 further comprising means of supplying a gas to the material in said vessel to facilitate said refinement.

8. The converter of claim 6 or claim 7 wherein the means of supplying said cool gas to said region comprises a duct circumferentially spaced from said body with an opening aligned with said open end of said jacket, whereby said body and said jacket may rotate with respect to said duct.

9. The converter of claim 2 or claim 7 wherein the means of supplying gas comprises a plurality of blast pipes.

10. The converter of claim 1 or claim 2 or claim 6 or claim 7 further comprising a means for lowering the gas pressure in said hood below atmospheric pressure, whereby gases are prevented from escaping from said first opening.

11. The converter of claim 10 wherein the pressure is lowered only to an extent which prevents atmospheric gases from being drawn into said first opening.

* * * * *